(12) United States Patent
Menten

(10) Patent No.: US 9,177,168 B2
(45) Date of Patent: Nov. 3, 2015

(54) METHOD OF MODIFYING ACCESS CONTROL FOR WEB SERVICES USING QUERY LANGUAGES

(75) Inventor: Lawrence E. Menten, Upper Saddle River, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 746 days.

(21) Appl. No.: 13/423,795

(22) Filed: Mar. 19, 2012

(65) Prior Publication Data

US 2013/0246454 A1 Sep. 19, 2013

Related U.S. Application Data

(63) Continuation-in-part of application No. 13/423,697, filed on Mar. 19, 2012, now Pat. No. 9,047,643.

(51) Int. Cl.
| | |
|---|---|
| *G06F 17/30* | (2006.01) |
| *G06F 21/62* | (2013.01) |
| *G06F 21/60* | (2013.01) |
| *H04L 29/06* | (2006.01) |
| *G06Q 10/10* | (2012.01) |
| *G06Q 30/02* | (2012.01) |
| *G06Q 50/00* | (2012.01) |
| *H04L 29/08* | (2006.01) |

(52) U.S. Cl.
CPC ...... *G06F 21/6218* (2013.01); *G06F 17/30625* (2013.01); *G06F 21/604* (2013.01); *G06Q 10/1093* (2013.01); *G06Q 30/0251* (2013.01); *G06Q 50/01* (2013.01); *H04L 63/102* (2013.01); *H04L 67/22* (2013.01)

(58) Field of Classification Search
CPC .................................................. G06F 17/30424
USPC ......................................... 707/769; 709/229
See application file for complete search history.

(56) References Cited

U.S. PATENT DOCUMENTS

| | | | |
|---|---|---|---|
| 5,493,678 | A | 2/1996 | Arcuri et al. |
| 5,892,513 | A | 4/1999 | Fay |
| 7,467,212 | B2 | 12/2008 | Adams et al. |
| 7,853,661 | B2 | 12/2010 | Bristol et al. |
| 8,024,317 | B2 | 9/2011 | Nair et al. |
| 8,136,145 | B2 | 3/2012 | Fetterman et al. |
| 8,180,804 | B1 | 5/2012 | Narayanan et al. |
| 2002/0131431 | A1 | 9/2002 | Wank et al. |
| 2007/0005750 | A1 | 1/2007 | Lunt et al. |
| 2008/0172407 | A1 | 7/2008 | Sacks |
| 2010/0198845 | A1 | 8/2010 | Kutsch et al. |
| 2012/0066118 | A1 | 3/2012 | Dantas |
| 2013/0246454 | A1 | 9/2013 | Menten |

OTHER PUBLICATIONS

International Search Report and Written Opinion correlating to PCT/US2013/032751 dated Aug. 15, 2013, 7 pages.
International Search Report and Written Opinion correlating to PCT/US2013/032759 dated Sep. 26, 2013, 11 pages.
Non-Final Office Action mailed May 31, 2013 for U.S. Appl. No. 13/423,697, 26 pages.
Notice of Allowance mailed Sep. 16, 2013 for U.S. Appl. No. 13/423,697, 15 pages.
Friendship and Inheritance Friend Functions; www.cplusplus.com/doc/tutorial/inheritance Retrieved May 29, 2012.
U.S. Appl. No. 13/423,697, filed Mar. 19, 2012, entitled "Method of Extending Web Service Application Programming Interfaces Using Query Languages".
Notice of Allowance mailed Jan. 15, 2015 for U.S. Appl. No. 13/423,697, 16 pages.

*Primary Examiner* — Robert Beausoliel, Jr.
*Assistant Examiner* — Nirav K Khakhar
(74) *Attorney, Agent, or Firm* — Davidson Sheehan LLP

(57) ABSTRACT

Embodiments of the claimed subject matter provide a method of controlling access to resources in a social graph. One embodiment of the method includes receiving information for configuring a query in response to a service being invoked. The service is configured to use the query to request access to resources associated with a node in a portion of a social graph associated with a first user. The method also includes associating the query with the node. The query operates on the resources associated with the node and returns information indicating whether a request to access the resources is granted or denied depending on a current state of the social graph.

31 Claims, 7 Drawing Sheets

METHOD OF MODIFYING ACCESS CONTROL FOR WEB SERVICES USING QUERY LANGUAGES

CROSS REFERENCE TO RELATED APPLICATIONS

This application is a continuation-in-part of U.S. patent application Ser. No. 13/423,697, filed on Mar. 19, 2012 now U.S. Pat. No. 9,047,643 entitled "Method of Extending Web Service Application Programming Interfaces using Query Languages" by Lawrence E. Menten.

TECHNICAL FIELD

This application relates generally to processor-based systems, and, more particularly, to access control for processor-based systems.

BACKGROUND

This section introduces aspects that may be helpful in facilitating a better understanding of the claimed subject matter. Accordingly, the statements of this section are to be read in this light and are not to be understood as admissions about what is in the prior art or what is not in the prior art.

In some known communication schemes, users communicate with each other using social networks. Social networking services can be defined as an online service, platform, or site that provides services to subscribers based upon a representation of social relations among people who may share a common background, interest, or activity. A social network typically consists of a representation of each user (often a profile), his/her social links, and a variety of additional elements such as photographs, status reports, web links, or the like. Most social network services are web-based and provide tools/services that allow users to interact over the Internet, such as e-mail and instant messaging. Social networking sites allow users to share ideas, activities, events, and interests within their individual networks. Exemplary social networks include Facebook, Google+, Twitter, LinkedIn, VKonkatke, Orkut, and RenRen.

Social networks represent individuals and their relations using a social graph. Generally, a social graph describes the relationships between a subscriber's online persona (which may also be referred to as the user's avatar) and other subscribers' online personas. The social graph therefore reflects the real-world relationships between the subscribers, which are generally referred to as the social network. For example, the social graph of a social network can be structured as a series of nodes (e.g., "Subscriber," "FriendsLists," "Close-Friends," etc.) that are associated with each other using edges (which may also be referred to as links or connections) defined by the relationships between the nodes. Leaf nodes are associated with a parent node but they have no child nodes. For example, leaf nodes associated with the "Close-Friends" node may each include a data structure including information for one of the subscriber's friends. The social graph may also include nodes for different types of relationships such as groups associated with a particular interest, as well as nodes for different types of information such as photographs, music, and web links. The nodes, edges, information, and relationships that make up the social graph may be referred to as resources of the social graph.

Resources in the social graph may be associated with users or subscribers that are not explicitly connected in the social graph by an edge representing a relationship. For example, a subscriber may post a group photograph of all of the alumni at a reunion picnic. The group photograph may include images of people who are listed in the FriendsLists or CloseFriends groups of the subscriber and other people who are not linked to the subscriber in the social graph. The subscriber or friends of the subscriber may identify or "tag" people in the group photograph who are not linked to the subscriber. For another example, a subscriber may define groups, such as a "Business_Lunch_Group", that includes other subscribers that are all linked to the subscriber who defined the group but who may not be linked to each other in the social graph. The subscribers who are linked together may not be able to exchange information through the social network such as planning messages for scheduling a business lunch.

Providers of social networks use the information in their social graph to implement services or applications (apps). Developers can create services or apps using an application programming interface (API) developed and supported by the social network provider. The API for a social network usually implements a Representational State Transfer (REST) architecture that consists of clients and servers. Clients initiate requests to servers, which process requests and return appropriate responses to the clients. Requests and responses are built around the transfer of representations of resources. A resource can be virtually any coherent and meaningful concept that may be addressed. A representation of a resource is typically a document that captures the current or intended state of a resource. Generally, a REST-ful architecture must be client-server based, stateless, cacheable, layered, use a uniform interface, and may provide code on demand. For example, an API for a social network such as Facebook includes a defined set of Hypertext Transfer Protocol (HTTP) request messages along with a definition of the structure of response messages, e.g., in an Extensible Markup Language (XML) or JavaScript Object Notation (JSON) format.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for controlling access to resources in a social graph. One embodiment of the method includes receiving information for configuring a query in response to a service being invoked. The service is configured to use the query to request access to resources associated with a node in a portion of a social graph associated with a first user. The method also includes associating the query with the node. The query operates on the resources associated with the node and returns information indicating whether a request to access the resources is granted or denied depending on a current state of the social graph.

In another embodiment, a method is provided for controlling access to resources in a social graph. One embodiment of the method includes invoking a service configured to perform queries on resources associated with a node in a portion of a social graph owned by a first user. This embodiment of the method also includes associating a query with the node in response to invoking the service. The query determines whether to grant or deny requests to access the resources associated with the node depending on a current state of the social graph.

BRIEF DESCRIPTION OF THE DRAWINGS

The disclosed subject matter may be understood by reference to the following description taken in conjunction with the accompanying drawings, in which like reference numerals identify like elements, and in which.

DETAILED DESCRIPTION OF SPECIFIC EMBODIMENTS

Figure 1:
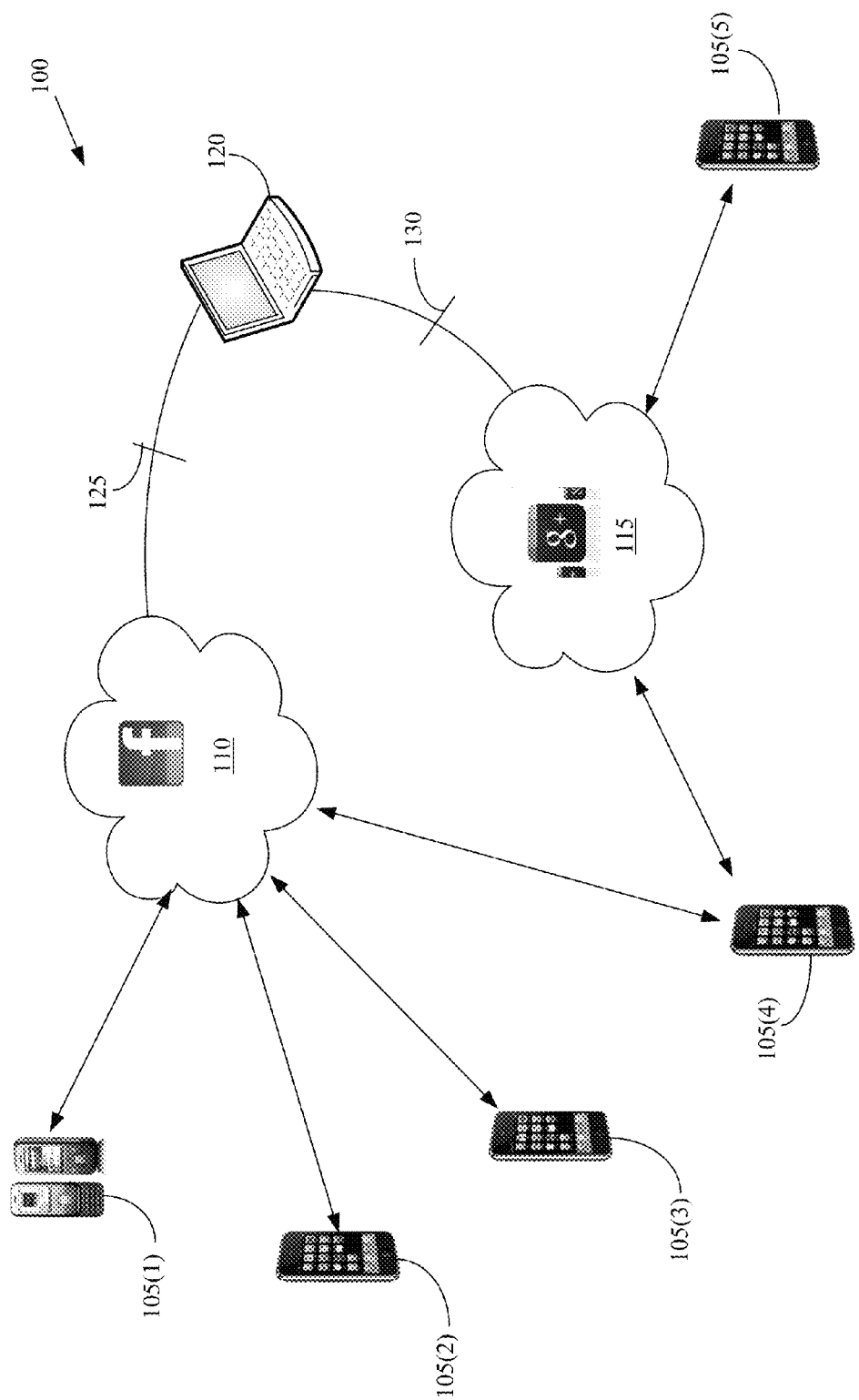
FIG. 1 conceptually illustrates one exemplary embodiment of a communication system.

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It will thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

Subscribers to social network services (or other users thereof) rely upon the social network service provider to keep the subscriber's personal information secure and private. However, subscribers also use social network services to broadcast, transmit, or display personal information to selected subscribers, e.g. subscribers indicated in "FriendsLists." The social network service provider attempts to balance the competing desires to make information public and keep it private by defining access control policies that determine whether users are able to access resources associated with particular parts of the social graph. For example, users that have been designated in the "FriendsLists" of Joe Subscriber are typically able to see status updates, photographs, or any other information that is posted by Joe Subscriber. Joe's friends in the network may also be able to send or post information to Joe Subscriber, e.g. by writing on his "wall" or commenting on the information he has posted. Other users are not typically able to see information posted by Joe Subscriber or to comment on information that he has posted. Subscribers have a limited ability to control access to their information, e.g. by making some categories of information public or limiting access to other information categories to friends or friend-of-friends.

The access control policies that determine who can access information in the social graph are generally static. For example, current RESTful web service APIs statically define both the resources in the social graph and the access control scheme that gates access to those resources. The access control schemes are not extensible by the end-user/subscriber or by an application developer or other third party. Thus, even though a subscriber can limit access to their personal information using the predefined security settings, neither a subscriber nor a third party can alter the predefined security settings. Consequently, many potentially valuable applications cannot be created because granting the access required for the operation of the application would require granting broader access to resources than the end user or the service provider is willing to permit, e.g. on a global basis for all users at all times.

Embodiments of the techniques described in the present application may allow developers or third parties to attach queries to resources (either existing or new) that grant access to the associated resource based on the current state of the social graph. For example, the query may grant access to a resource based on the relationship of the requesting user to the user that owns the resource, the relationship of the requesting user to the resource, or a combination of both criteria. Access to the resources may also be granted or denied based on past interactions between the resource owner and the resource requester, e.g., access may be granted to requesters that have frequently appeared in photos or frequently commented on resources owned by the resource owner. The access granting queries return a Boolean value indicating whether or not access has been granted to the resource. Users or the social network service provider may authorize attaching the query to the resource before the access control query can be added to the social graph. Developers or other third parties may create queries that can provide conditional access to a user's resource and then use these queries to create applications or services that make use of the expanded accessibility of the user's resources. For example, a developer may create an application that grants access to a resource such as a photograph posted by a first user so that users or subscribers that are tagged in the photograph can comment on the photograph even if they are not ordinarily authorized to read or write to resources owned by the first user. The access control queries may be dynamic or temporary. For example, an authorized access control query may be attached to a user's resource in response to the user initiating a service that uses the access control query and then the access control query may be removed when the service is terminated.

FIG. 1 conceptually illustrates one exemplary embodiment of a communication system 100. In the illustrated embodiment, the communication system 100 includes a plurality of subscribers or users 105. As used herein, the term "subscriber" will be understood to refer to users that have subscribed to a social network service that supports a social graph. The term "user" will refer to people or entities that may be referenced in the social graph or associated with the social graph but which are not necessarily subscribers to the social network service. Subscribers may therefore be a subset of the users associated with a social network service. For example, a subscriber may be referred to as a registered user of a social network service. The users 105 are depicted as mobile communication devices such as smart phones. However, persons of ordinary skill in the art having benefit of the present disclosure should appreciate that the term "user" may refer to either the electronic device used to access the communication system 100 or to the person that owns or operates the device. Furthermore, persons of ordinary skill in the art should appreciate that the electronic devices are not limited to mobile communication devices and in some embodiments devices such as tablet computers, laptop computers, desktop computers, or the like may also be used to access the communication system 100. In various embodiments, the users 105 may access the communication system 100 using wired connections, wireless connections, or any combination thereof.

The users 105 may subscribe to one or more social network services 110, 115. Exemplary social network services include the social network service 110 provided by Facebook and the social network service 115 provided by Google+. However, persons of ordinary skill in the art having benefit of the present disclosure should appreciate that alternative embodiments of the communication system 100 may include other social network services such as Twitter, LinkedIn, VKonkatke, Orkut, RenRen, or the like. In the illustrated embodiment, the users 105(1-4) have subscribed to the social network service 110 and the users 105(4-5) have subscribed to the social network service 115. The users 105 may therefore have created profiles and established relationships to other subscribers in the social graphs of the social network services 110, 115. The users 105, information related to the users 105, and the relationships between the users 105 may be represented by the structure of the social graph. For example, the social graph of the social network 110 may include nodes (e.g., "Subscriber," "FriendsLists," "CloseFriends," etc.) that are associated with each other using edges defined by the relationships between the nodes.

Application developers 120 can develop applications (apps) or services that use the information in the social graphs of the social networks 110, 115 to generate and provide useful information to the users 105 or other third parties such as advertisers attempting to provide targeted advertising to the users 105. The application developers 120 create or define the applications or services using application programming interfaces (APIs) 125, 130 to the social network services 110, 115, respectively. The APIs 125, 130 are initially defined by the providers or owners of the social network services 110, 115 and the same APIs 125, 130 are supported for all of the users 105. In one embodiment, the APIs 125, 130 conform to the constraints imposed by representational state transfer (REST) architectures. A REST-ful web service API 125, 130 to the social networking sites 110, 115 may provide a resource hierarchy (defined by the service API) and support read or write access to various elements of the social network information associated with each user 105. For example, the resource hierarchy may define a tree that includes non-leaf nodes that define categories or subsets of information. The tree may also define the nodes or leaves that represent the instances of data that may be read or written through the web service APIs 125, 130. This arrangement is typical of many web services. In conventional web services, the resource naming scheme is defined by the service provider and is not extensible.

As discussed herein, the REST-ful web service APIs 125, 130 to the social networking sites 110, 115 statically define the resources and the access control scheme that controls or gates access to the resources. Embodiments of the techniques described herein allow expansion or extension of the APIs 125, 130 to support more flexible access control, e.g., by expanding access control rights on a per-user or per-service or per-application basis. The expanded access control rights may be used to grant access depending on the current state of the social graph. For example, access to selected resources may be conditionally granted to users or subscribers depending on their relationship to the selected resource or their relationship to the owner of the resource. In one embodiment, instead of attempting to anticipate the granularity of access control for a RESTful web service that may be required by new services or applications, application developers may be able to customize access control using appropriately defined query expressions.

Various embodiments of access control queries may be defined using logical expressions and may return different values. In one embodiment, developers may select or specify a Boolean-valued (TRUE/FALSE) query expression that may be applied against web service resources to determine whether a user may access the web service resources. Developers may alternatively select or specify query expressions that return other parameters that can be used to indicate the access control status of a user. For example, a query expression that returns a counter value that indicates the number of times a user has previously accessed related resources be used to determine whether the user is given access to the web service resource. More complicated queries may also be defined. For example, the query expression granting access control may be a query returning a logical expression that combines the results of the query with logical operators (e.g., "AND, "OR, or" NOT") or mathematical comparison operators ($<$, $<=$, $>$, $>+$, $==$, $!=$) to provide a Boolean (TRUE or FALSE) result. For another example, a function in a dynamic language may be provided, e.g., expressed in JavaScript, which operates on the rows and columns of one or more query "result sets" to provide a TRUE/FALSE result. So, for example, access control query expression containing two queries might be of the form:

```
"(0 < (SELECT count from friends_table where ...)) AND (6 <
    (SELECT count from photos_table where ...))"
```

Alternatively, with a JavaScript function, the query expression may be of the form:

```
"function hasRequestedAccess (Request_URI) {
    var rs = db.execute('select friend from friends_table
where ...');
    while ( rs.isValidRow( ) ) {
        ...
    }
    return isAccessGranted;
}"
```

Persons of ordinary skill in the art having benefit of the present disclosure should appreciate that the aforementioned exemplary queries are intended to be illustrative. Alternative embodiments of access control queries may use these formats, other query formats, or combinations thereof.

The query expression may be associated with a RESTful action (GET, PUT/POST, DELETE) and may determine whether or not access is granted for a web service request. The query expression could be implemented in any query language including SQL, SPARQL, or XPath. The query expression can be directly associated with the target resource or may alternatively be added to the web service as an additional resource that can be applied against a number of resources and revoked or modified for some or all of them in a single operation. A name or description that suggests or describes the nature of the permission granted by the query expression may be associated with the query expression. If the query expression is added as an extension to the web service, then the name may be used as an element of the resource name in the URI used to establish, read, and delete the query expression through a RESTful PUT/POST, GET, and DELETE operation.

In the illustrated embodiment, users 105 may post resources to one or more of the social network services 110, 115 and may invoke services that can provide conditional access to the posted resources. For example, the user 105(4) may post a group photograph on Facebook and then invoke a service that attaches a query to a node associated with the group photograph to conditionally grant access to users that are tagged in the photograph, regardless of any other relationship that the users may have to the user 105(4) that on the photograph. The user 105(1) may comment on the photograph if the user 105(1) is a Facebook friend of the user 105(4). The user 105(2) may not be a Facebook friend of the user 105(4) but the service may use the query to grant conditional access to the user 105(2) so that the user 105(2) can comment on the photograph if the user 105(2) is tagged in the photograph. The user 105(3) may not be a Facebook friend of the user 105(4) and may not be tagged in the photograph. The query therefore does not grant access to the user 105(3).

Embodiments of the communication system 100 may allow developers 120 with appropriate permissions to extend the resource tree by adding leaf nodes representing new "views" of the data represented by the node to which the new leaf node is attached. These nodes can be named by the developer 120 and associated with one or more access control queries that operate on the data subset (or sub-tree) identified by the branch of the tree in which the new leaf node is inserted. The nodes or queries may be added through an off-line web interface or inserted through a HTTP POST request. The queries/views may be named or defined by the developer 120 or the queries/views may be selected from a menu of pre-defined "queries/views" available from the provider of the social network services 110, 115. In various alternative embodiments, query parameters may be defined by the developer, determined by the context/node, or dynamically determined by the service or application.

Figure 2:
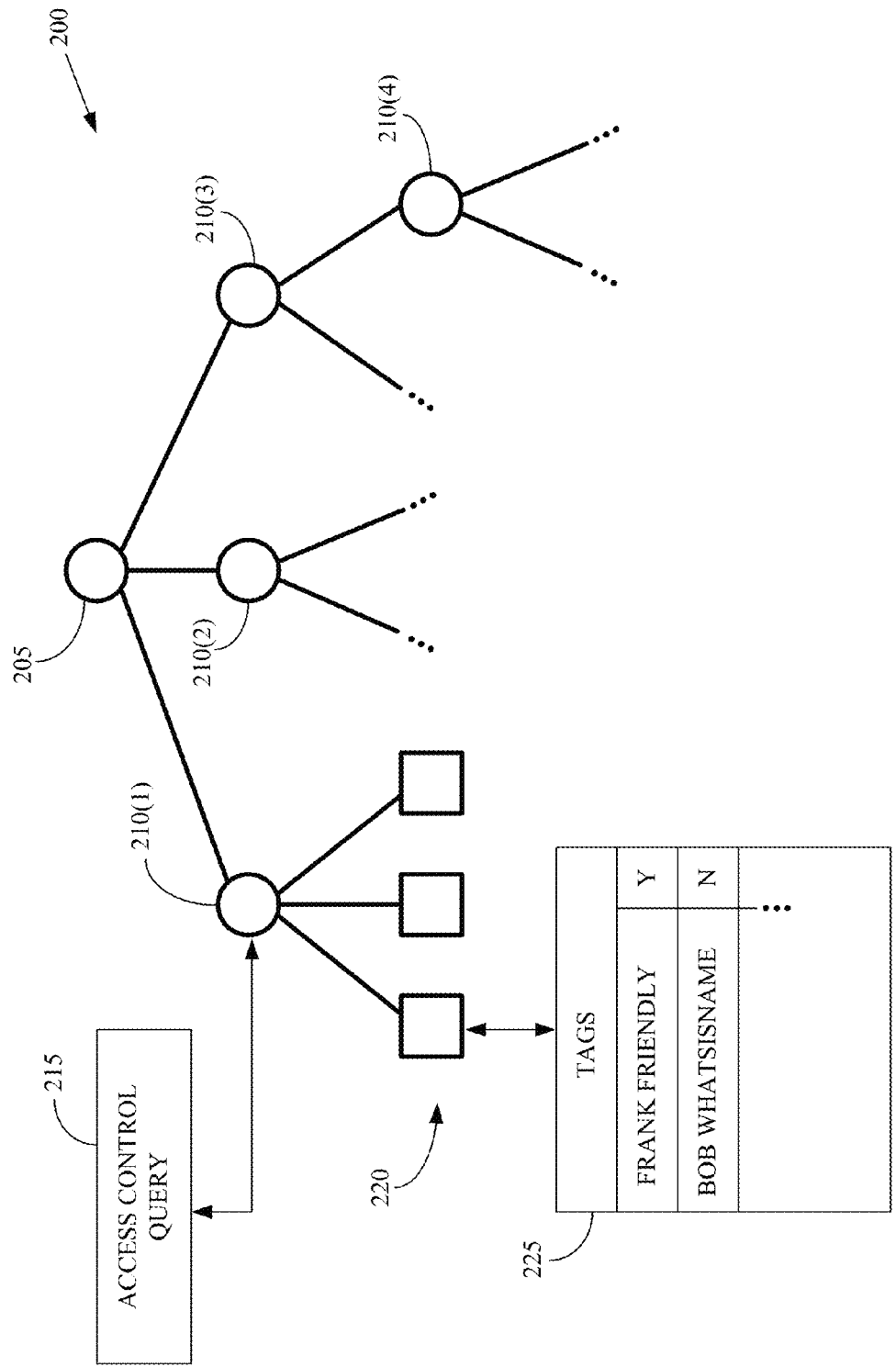
FIG. 2 conceptually illustrates a first exemplary embodiment of a portion of a social graph.

FIG. 2 conceptually illustrates a first exemplary embodiment of a portion of a social graph 200. In the illustrated embodiment, the portion 200 is a sub-tree of the full social graph and the sub-tree 200 includes nodes associated with a particular subscriber, "Joe Subscriber." The portion 200 can be accessed via an entry node or parent node 205. The portion 200 may be stored in one or more servers and clients can access the entry node 205 by sending the appropriate Uniform Resource Indicator (URI) or other address to the server. For example, the entry node 205 may be accessed by sending the URI address http://www.fakesocialnetwork.com/Joe.Subscriber. The portion 200 also includes child nodes 210 that are connected to the entry node 205 or to other nodes within the portion 200. The child nodes 210 may be associated with information, categories, other subscribers, or the like. For example, the child nodes 210 may be associated with "Friends," "Photographs," "Profile," "Music," or the like. The nodes 200 may also be associated with groups of subscribers or users that share interests or groups that indicate the nature of the relationship between the users/subscribers such as family, close friends, acquaintances, professional contacts, etc. The nodes 210 may be accessed using corresponding addresses such as:

http://www.fakesocialnetwork.com/Joe.Subscriber/
FriendsLists/CloseFriends, and http://www.fakesocialnetwork.com/Joe.Subscriber/Photographs.

In the illustrated embodiment, developers or other third parties can attach one or more access control queries 215 to nodes 210 in the portion 200 of the social graph corresponding to the subscriber. The access control queries 215 may operate on resources 220 associated with the node 210(1), such as photographs or other resources. In one embodiment, the developer may use a message or command to define the query 215 and attach the query 215 to one or more nodes to modify an application programming interface (API) to the social graph 200. For example, the query 215 may be attached to the node 210(1) (e.g., the Photographs node) in response to Joe Subscriber invoking a service that utilizes the query 215 to modify access control for the resources 220 associated with the node 210(1). One example of an address that invokes the query is:

http://www.fakesocialnetwork.com/Joe.Subscriber/Photographs/Photo1/Tagged_User, which invokes the query 215 attached to a Photographs node 210(1). The query 215 may return a Boolean TRUE if a user indicated in the query 215 is tagged in Photo1, thereby granting the user access to the resource, e.g., to comment on the photograph. Otherwise, the query 215 may return a Boolean FALSE to indicate that the request for access has been denied. For example, the photograph Photo1 may include tags for Frank Friendly and Bob Whatsisname. The tags may be indicated in a tag list 225 or using any other indicator. Frank Friendly is a friend of Joe Subscriber, as indicated by the "Y" in the tag list 225, and Bob Whatsisname is not a friend of Joe Subscriber, as indicated by the "N" in the tag list 225. However, the query 215 may grant Bob Whatsisname conditional access rights to the photograph Photo1 because Bob Whatsisname is tagged in the photograph Photo1.

Embodiments of conventional query languages may typically be flexible enough to allow a single query to be designed that may be applied in different positions or nodes within the social graph 200. The nodes may be selected for each query 215 by the developer or the nodes may be selected using an automated procedure or algorithm. For example, the social networking site may examine the query 215, select the appropriate nodes to which to apply the query 215, apply the query 215 iteratively (or concurrently) to the selected nodes in the tree, and combine the results. In some embodiments, the developer or third-party may need to obtain permission or authorization to attach the query 215 to the social graph 200. For example, the developer or third-party may need to obtain permission or authorization from Joe Subscriber or the service provider or owner of the social graph. The authorization may only be valid for a limited amount of time, e.g., after a subscriber has invoked or initiated an application or service that utilizes the query 215 and until the subscriber terminates the application or service. The query 215 may therefore be a temporary or dynamic query.

Figure 3:
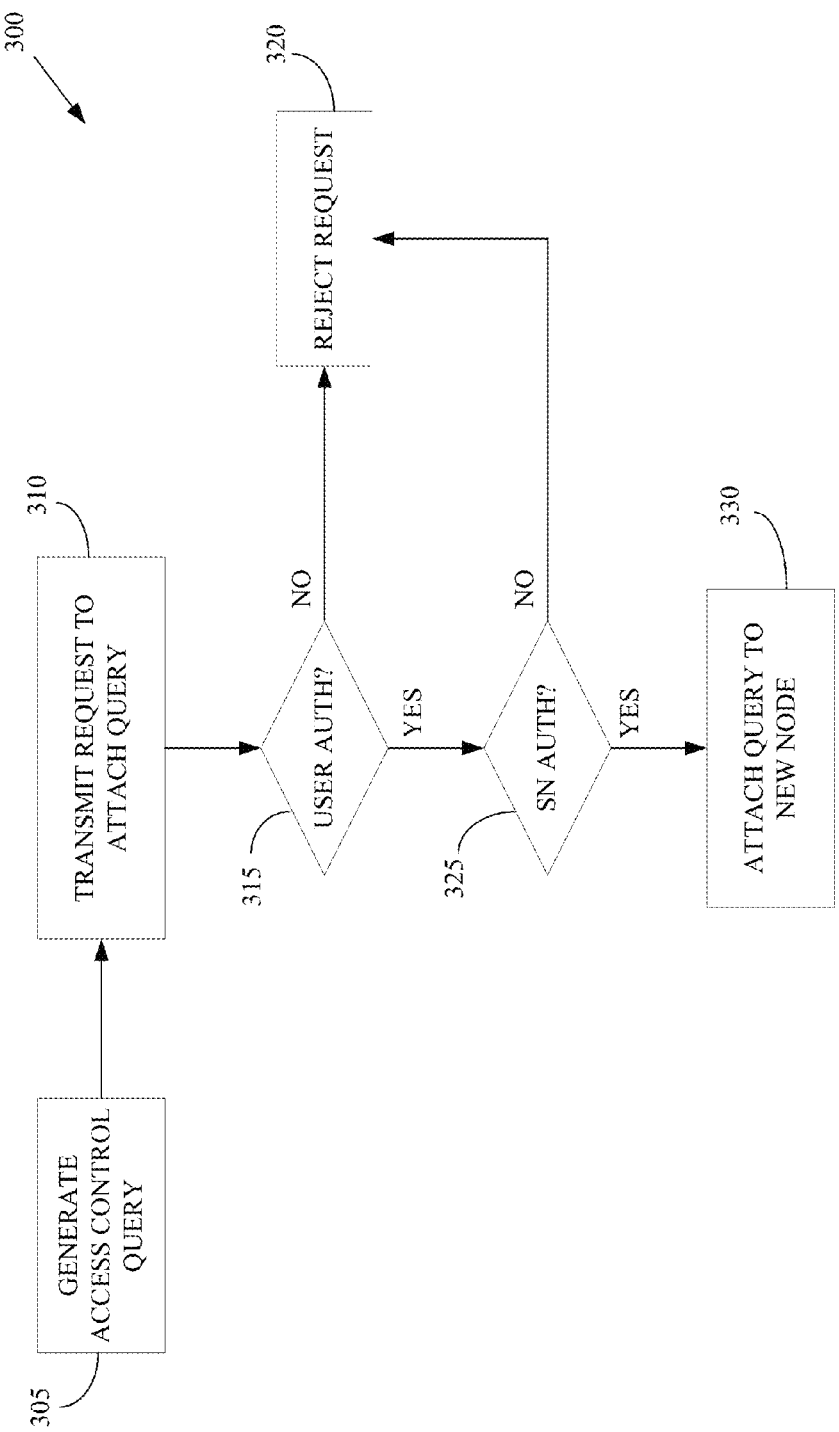
FIG. 3 conceptually illustrates a first exemplary embodiment of a method for modifying access control for a social graph.

FIG. 3 conceptually illustrates a first exemplary embodiment of a method 300 for modifying access control for a social graph. In the illustrated embodiment, an access control query is generated (at 305) by a developer or third-party. The access control query may be used as part of a service or application created by the developer or third-party. The access control query may operate on a sub-tree of a node that is defined by the developer or third-party and is intended to be inserted into a portion of a social graph associated with one or more users, e.g., subscribers that have invoked the service that utilizes the query. The developer or third-party may then transmit (at 310) a request to attach the query to one or more designated nodes. For example, a query expression may be written as a REST-ful POST request that requests a modification of the access control to the resources of the social graph.

In a conventional access control scheme, a user of a REST-ful service presents an access token to the service (or an application presents the access token on behalf of the end user) and the access token identifies the access that has been granted to the user/application. Predetermined resources of the service may specify what access privileges are granted to a particular user. For example, in Google calendar a user may be assigned a role that determines the access rights for that user. For a given resource (e.g., Google: "/calendar/v3/calendars/KidsEvents"), the role determines whether or not the user has access to the resource (through an HTTP GET request), can update the calendar (through an HTTP PUT request), or can delete the calendar (through an HTTP DELETE request). The roles grant a collection of access rights that are predefined for the role. The predetermined roles are fixed by the service provider and are not extensible by the user, developers, or third parties.

In the illustrated embodiment, the requested (at 305) access control query can be used to grant individual access rights to the resource, thereby bypassing role-based access control. Alternatively, a user may be associated with a particular role based upon the result of the requested (at 305) access control query, which may override (or augment) the access granted to the user through the access token. The access control query would be attached to a node in the resource tree and the placement of the query node might determine the scope of the role. For example, the query scope may be limited to the resources in the sub tree to which the query is attached. The query node may be given a meaningful name. For example, the query node for a query that determines whether or not to give caregivers access to a subscriber's calendar that lists children's events may be named "GrantCaregiversAccess" and may be replaced or deleted using the associated URI.

http://www.fakesocialnetwork.com/Joe.Subscriber/Calendar/CalendarsKidsEvents/GrantCaregiversAccess With the appropriate authorization, a post request used to create the query for a Google calendar-like service might use the format (JSON):

```
POST /calendar/calendars HTTP/1.1
Content-Type: application/json
Content-length:200
...
{
    "kind": "calendar#calendarAccessControlQuery",
    "id": "GrantCaregiversAccess",
    "accessRole": "reader".
    "query": "SELECT ..."
}
```

Alternatively, the post request may use the following format to grant specific rights via a GET command:

```
POST /calendar/calendars/ HTTP/1.1
Content-Type: application/json
Content-Length:203
...
{
    "kind": "calendar#calendarAccessControlQuery",
    "id": "GrantCaregiversAccess",
    "accessRights": "GET".
    "query": "SELECT ..."
}
```

To delete an access control query, the application or end user might issue an HTTP request such as:

DELETE/calendar/calendars/GrantCaregiversAccess HTTP/1.1

In various alternative embodiments, one or more access control queries could be attached to a given node although in practice, a user may choose to employ a few of high value to that user. In some embodiments, shadow nodes or pattern matching may be used to associate a query to a node that is not under the control of the user who has crafted the query.

For another example, in the context of a Facebook-like service, the query may be used to grant or deny access to a photo album or to individual photos in the album based upon the design of the query. The service may determine whether the query grants access to the album or list of albums to which it is attached or to individual photos within the album or list of albums to which it is attached based upon the parameters to the query:

```
POST /Joe.Subscriber/ElizabethHighSchoolGraduation/photos
HTTP/1.1
    Content-Type: application/json
    Content-Length:203
    ...
    {
        "kind": "AccessControlQuery",
        "id": "GrantElizabethFriendsAccess",
        "accessRights": "GET".
        "query": "SELECT ..."
    }
```

Photos in Facebook may each have a number of "properties" and these might appear in the query to further restrict access. For example, the "tags" property lists the individuals pictured in the photo and can be used to limit access only to those photos in which a particular user is pictured.

In the illustrated embodiment, the request to attach the access control query may require authorization from the user/subscriber. The user authorization process may be performed (at 315) to verify that the user has authorized attaching the access control query to one or more nodes the user's social graph. User authorization can be performed using various techniques. For example, the request to insert the query may include a request to initiate authentication/authorization process that allows the user to indicate (at 315) whether they approve or allow implementation of the new query. The request is rejected (at 320) if the user does not provide confirmation or authentication. The request may proceed if the subscriber confirms or authenticates the request.

In the illustrated embodiment, the request may also require authorization from the provider or owner of the social network (SN) service. The provider authorization process may be performed (at 325) to verify that the provider/owner has authorized inserting the new query into the user's social graph. Provider authorization can be performed using various techniques. For example, the request to attach the access control query may include a request to initiate an authentication/authorization process that allows the provider to indicate (at 315) whether they approve or allow implementation of the new query. In one embodiment, the provider may perform the authentication/authorization process using an automated system that reviews the request and determines whether the request complies with security, privacy, or other policies established by the provider. Before installation into the web service, the query may be mechanically validated to assure that it complies with the security/usage policy of the web service. For example, the web service may only allow queries that return Boolean results may restrict the node types with which an access control query may be associated (e.g. only the "Photographs" node). The request is rejected (at 320) if the provider does not provide confirmation or authentication. The request may proceed if the provider confirms or authenticates the request. Persons of ordinary skill in the art having benefit of the present disclosure should appreciate that the particular authentication sequence depicted in FIG. 3 is intended to be illustrative. Alternative embodiments may perform the user and provider authentication processes concurrently or in a different order than the one depicted in FIG. 3. Moreover, other alternative embodiments may only perform user authentication or provider authentication, but not both, or may not perform any authentication at all.

Once the request has been authorized, the requested query may be attached (at 330) at the selected position within the social graph. The developer, third-party, or other entities, may then be able to use the modified interface to enable applications or services that utilize the new query. For example, the POST request described above may result in extending the API for the subscriber (Joe Subscriber) so that it is now possible to make a GET request for the URI:

http://www.fakesocialnetwork.com/Joe.Subscriber/Photographs/Photo1

Access control to the requested resource (i.e., the photo Photo1) can be determined using a query such as:

http://www.fakesocialnetwork.com/Joe.Subscriber/Photographs/AllowAccessforTaggedUser The access control query returns a Boolean value depending upon whether or not Bob Whatsisname is in the tag list for the photo Photo1. In one embodiment, the access control query is visible to developers and available to the application that uses the access control query but the access control query may not be visible to users so that the users attempting to gain access to the resource may be unaware that any access control is being performed.

Embodiments of the method 300 may therefore support modified interfaces that provide a wider and more varied set of access control rights while reducing the risk of providing excessive or complete access to the underlying database that represents the social graph. The modification made by the POST request may only affect the user who authorized the request (Joe Subscriber) and can be reversed by a corresponding HTTP DELETE request or other operation. In one embodiment, the mechanism for inserting the query may be to create a record that is associated with the end user. The inserted record may contain the query and the associated path to be used in the GET request. In various embodiments, the Web service supports one or more query languages and publishes a schema to accompany the query languages.

Figure 4:
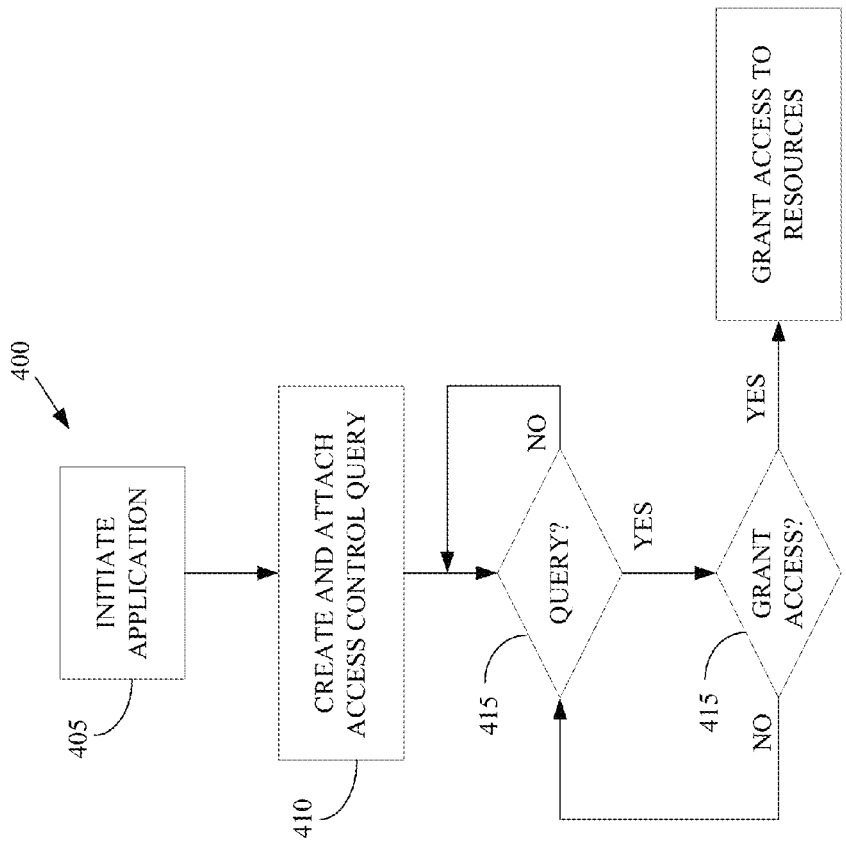
FIG. 4 conceptually illustrates one exemplary embodiment of a method of querying a modified application programming interface to a social graph.

FIG. 4 conceptually illustrates one exemplary embodiment of a method 400 of querying a modified application programming interface to a social graph. In the illustrated embodiment, the method 400 modifies the application programming interface on a per-user and per-application basis so that the access control rights used by the interface are not globally changed for all time, but are only changed when particular users invoke a service that uses the modified interface and, in some embodiments, only for those users that have invoked the related service and authorized modification of the interface to the relevant portion of the social graph. One or more users may initiate (at 405) a service or application. The initiated application may utilize an access control query that is not supported by the provider-defined API. One or more new access control queries may then be created and the access control query (or queries) may be attached to the relevant node (at 410). Embodiments of techniques for attaching queries are depicted in FIG. 3.

The service provider (e.g., using software, firmware, or hardware implemented on one or more servers owned or operated by the service provider) may then monitor (at 410) queries associated with the service. Monitoring may continue as long as the service provider does not detect (at 410) any queries. When the service provider detects (at 415) an access control query, e.g., a query performed to request access to the social graph as part of the service requested or invoked by the subscriber, the query can be performed (at 420) on information included in a sub-tree of the node associated with the query. For example, the query may return (at 420) a Boolean value indicating whether the access request has been granted or denied based at least in part on the information included in the sub-tree of the node.

Figure 5:
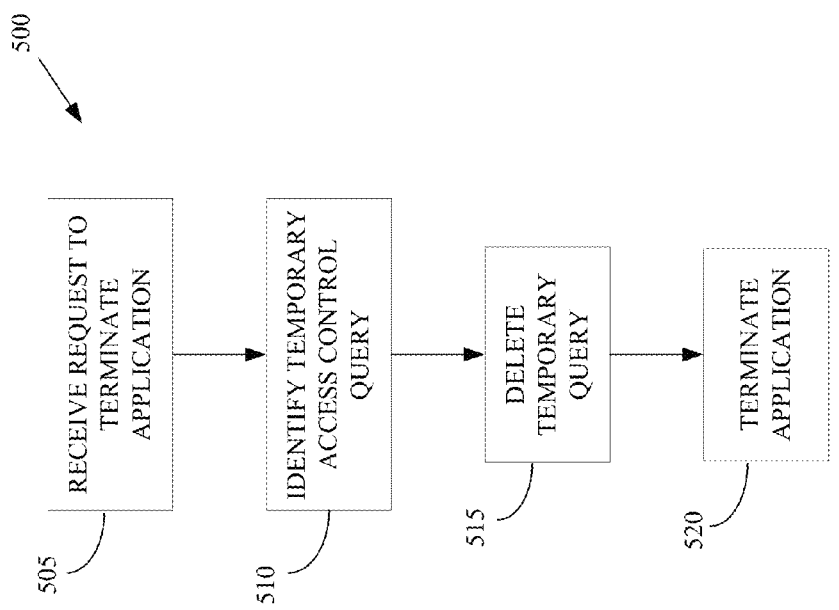
FIG. 5 conceptually illustrates one exemplary embodiment of a method of removing or reversing a modification to an application programming interface to a social graph.

FIG. 5 conceptually illustrates one exemplary embodiment of a method 500 of removing or reversing a modification to an application programming interface to a social graph. In the illustrated embodiment, the application programming interface has been previously modified (e.g., as described herein with regard to FIGS. 3-4) on a per-user or per-application basis in response to one or more users invoking a service that uses the modified interface and, in some embodiments, only for those users that have invoked the related service and authorized modification of the interface to the relevant portion of the social graph. One or more of the users that previously initiated the service, which resulted in modification of the interface to their social graph, may decide to terminate the application. The service provider may therefore receive (at 505) a request to terminate the application. The service provider may identify (at 510) the temporary access control queries that were attached to the social graph to support the modified interface. Identification (at 510) of the temporary queries may be performed using information stored by the service provider or information provided by the user. The temporary queries may then be deleted (at 515) and the application may be terminated (at 520). In one embodiment, deletion (at 515) of the temporary queries may include removal of nodes, leaf nodes, sub-trees, or other information associated with the temporary queries.

Figure 6:
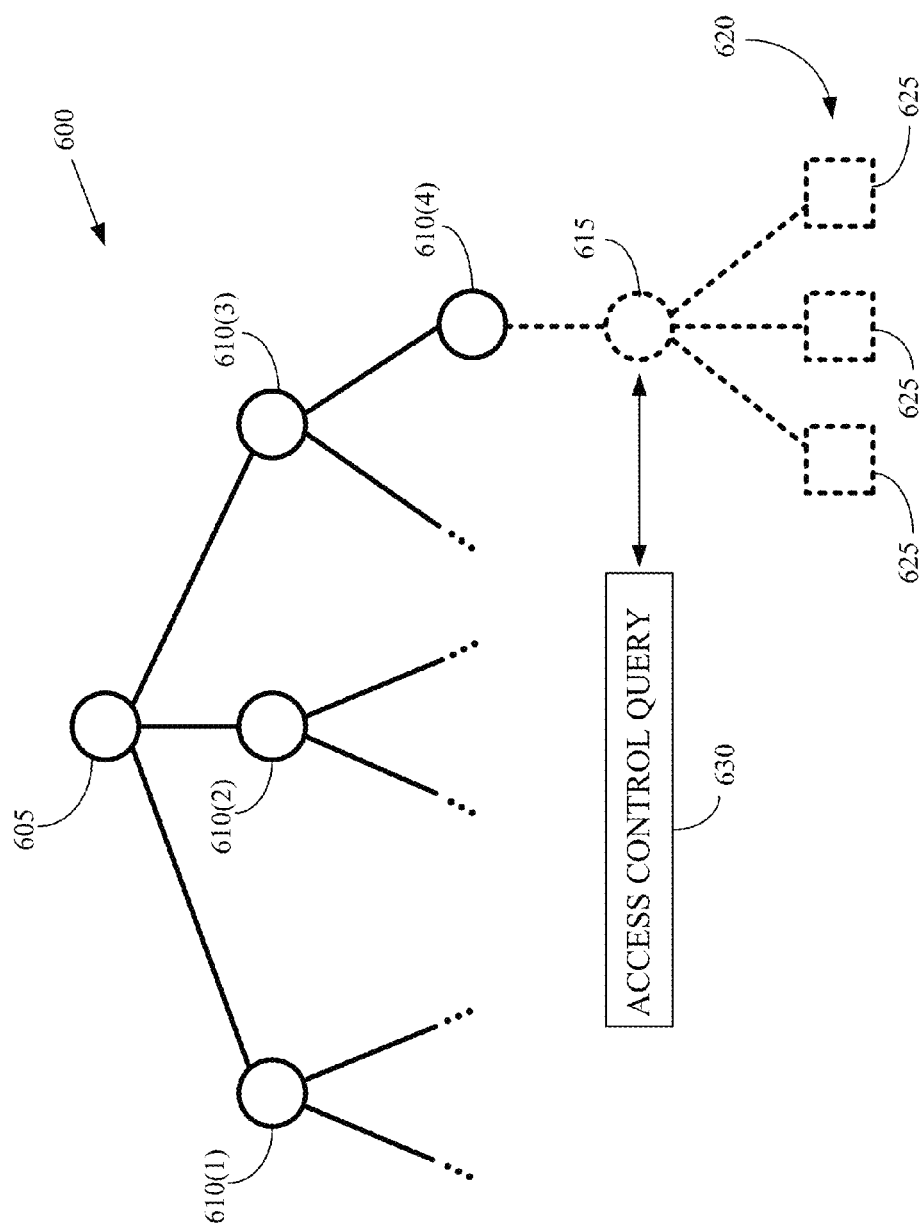
FIG. 6 conceptually illustrates a second exemplary embodiment of a portion of a social graph.

FIG. 6 conceptually illustrates a second exemplary embodiment of a portion of a social graph 600. As in the first embodiment shown in FIG. 2, the portion 600 is a sub-tree of the full social graph that includes nodes associated with a particular subscriber, "Joe Subscriber." The portion 600 can be accessed via an entry node or parent node 605. The portion 600 may be stored in one or more servers and clients can access the entry node 605 using the appropriate Uniform Resource Indicator (URI) or other address. The portion 600 also includes child nodes 610 that are connected to the entry node 605 or to other nodes within the portion 600. The child nodes 610 may be associated with information, categories, other subscribers, or the like, as discussed herein. The nodes 610 may be accessed using corresponding addresses such as:

http://www.fakesocialnetwork.com/Joe.Subscriber/Calendar.

In the illustrated embodiment, developers or other third parties can add one or more nodes 615 to the portion 600 of the social graph corresponding to the subscriber. For example, a developer may use an HTTP POST command to insert a node 615 that is associated or attached to the node 610(4) of the sub-tree 600. The node 615 may then be accessed using the appropriate URI or other address. For example, the node 610(3) may be associated with "Calendar" of Joe Subscriber, the node 610(4) may be associated with "Calendars" of Joe Subscriber, and the node 615 may be associated with a category that includes the events that Joe's children participate in such as "KidEvents." The node 615 may also be associated with or connected to a further sub-tree 620, which includes a plurality of leaf nodes 625 such as ballet lessons, soccer practice, piano recital, or the like. However, persons of ordinary skill in the art having benefit of the present disclosure should appreciate that the sub-tree 620 may include different combinations of nodes or leaf nodes. The sub-tree 620 or the leaf nodes 625 may be populated by the developer, a third-party, the subscriber, or automatically by the service provider. The node 615 may be accessed using an address such as:

http://www.fakesocialnetwork.com/Joe.Subscriber/Calendar/Calendars/KidEvents.

In some embodiments, the developer or third-party may need to obtain permission or authorization to add the nodes 615 to the social graph. For example, the developer or third-party may need to obtain permission or authorization from Joe Subscriber or the service provider or owner of the social graph. The authorization may only be valid for a limited amount of time, e.g., after a subscriber has invoked or initiated an application or service that utilizes the node 615 and until the subscriber terminates the application or service. The node 615 may therefore be a temporary or dynamic node.

The interface to the social graph 600 may be modified to support access control queries 630 that operate on the node 615 that was added to the social graph 600. In one embodiment, a developer may use a message or command to define the access control query 630 and attach the query 630 to one or more nodes to modify an application programming interface (API) to the social graph 200. For example, the node 615 for children's events "KidEvents" may be created and attached to a query that determines whether or not to give caregivers access to a subscriber's calendar that lists children's events may be named "GrantCaregiversAccess" and may be replaced or deleted using the associated URI.

http://www.fakesocialnetwork.com/Joe.Subscriber/Calendar/CalendarsKidsEvents/GrantCaregiversAccess With the appropriate authorization, a post request used to create the query for a Google calendar-like service might use the format (JSON):

```
POST /calendar/calendars HTTP/1.1
Content-Type: application/json
Content-length:200
...
{
   "kind": "calendar#calendarAccessControlQuery",
   "id": "GrantCaregiversAccess",
   "accessRole: "reader".
   "query": "SELECT ..."
}
```

However, in alternative embodiments, other addresses or request messages in other formats may be used to create the node 615 or the access control query 630.

Figure 7:
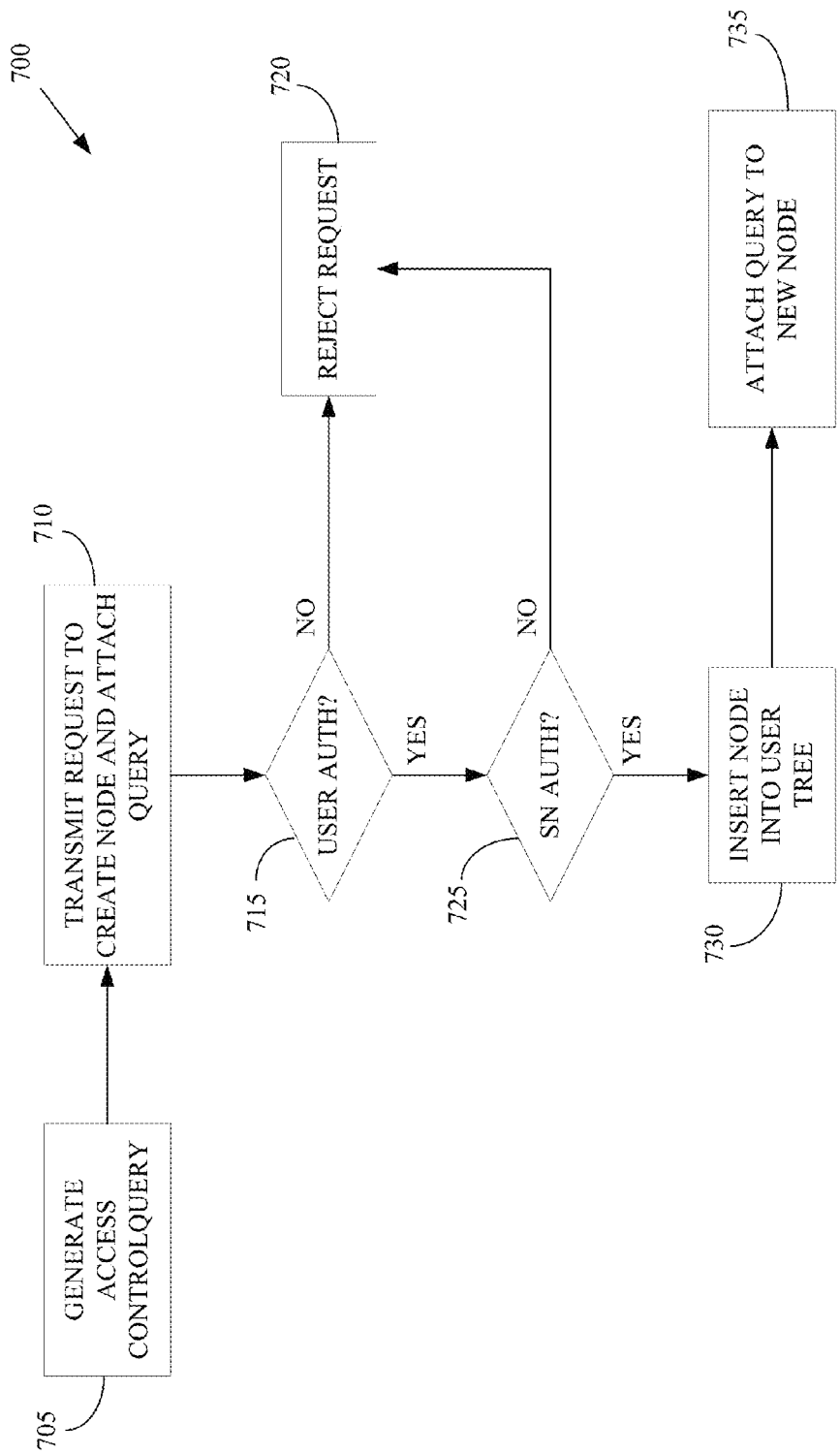
FIG. 7 conceptually illustrates a second exemplary embodiment of a method for modifying access control for a social graph.

FIG. 7 conceptually illustrates a second exemplary embodiment of a method 700 for modifying access control for a social graph. In the illustrated embodiment, an access control query is generated (at 705) by a developer or third-party, as discussed herein. The access control query may be used as part of a service or application created by the developer or third-party. The access control query may operate on a sub-tree of a node that is defined by the developer or third-party and is intended to be inserted into a portion of a social graph associated with one or more users, e.g., subscribers that have invoked the service that utilizes the query. The developer or third-party may then transmit (at 710) a request to create the node and attach the access control query to the newly created node. For example, a query expression may be written as a REST-ful POST request that requests a modification of the programmer's view of the API to the social graph. With the appropriate authorization, a post request to the URI:

http://www.fakesocialnetwork.com/Joe.Subscriber/Calendar/Calendars/ to extend the API might be written as follows:

```
POST /Joe.Subscriber/Calendar/Calendars/ HTTP/1.0
Content-Type: text/xml
<extend>
   <node>KidEvents</node>
   <query>SELECT ...</query>
</extend>
```

However, persons of ordinary skill in the art having benefit of the present disclosure should appreciate that other query expressions or formats may be used for the request.

In the illustrated embodiment, the request may require authorization from the user/subscriber. The user authorization process may be performed (at 715) to verify that the user has authorized inserting the new node into the user's social graph. User authorization can be performed using various techniques. For example, the request to create the node and attach the query may include a request to initiate authentication/authorization process that allows the user to indicate (at 715) whether they approve or allow creation of the new node and implementation of the new query. The request is rejected (at 720) if the user does not provide confirmation or authentication. The request may proceed if the subscriber confirms or authenticates the request.

In the illustrated embodiment, the request may also require authorization from the provider or owner of the social network (SN) service. The provider authorization process may be performed (at 725) to verify that the provider/owner has authorized inserting the new node into the user's social graph. Provider authorization can be performed using various techniques. For example, the request to create the node and attach the query may include a request to initiate an authentication/authorization process that allows the provider to indicate (at 715) whether they approve or allow creation of the new node or implementation of the new access control query. In one embodiment, the provider may perform the authentication/authorization process using an automated system that reviews the request and determines whether the request complies with security, privacy, or other policies established by the provider. Before installation into the web service, the access control query may be mechanically validated to assure that it complies with the security/usage policy of the web service. The request is rejected (at 720) if the provider does not provide confirmation or authentication. The request may proceed if the provider confirms or authenticates the request. Persons of ordinary skill in the art having benefit of the present disclosure should appreciate that the particular authentication sequence depicted in FIG. 7 is intended to be illustrative. Alternative embodiments may perform the user and provider authentication processes concurrently or in a different order than the one depicted in FIG. 7. Moreover, other alternative embodiments may only perform user authentication or provider authentication, but not both, or may not perform any authentication at all.

Once the request has been authorized, the requested node can be inserted (at 730) at the selected position within the social graph. The interface to the social graph can then be modified by attaching (at 735) the access control query to the new node or to nodes that are lower in the tree. The developer or third-party or other entities may then be able to develop applications or services that utilize the new access control query. For example, an access control query associated with the calendar KidEvents may be invoked using the URI:

http://www.fakesocialnetwork.com/Joe.Subscriber/Calendar/Calendars/KidEvents/GrantCaregiversAccess In the illustrated embodiment, request returns a Boolean TRUE if the request comes from an authorized caregiver and returns a Boolean FALSE if the request does not come from an authorized caregiver. Embodiments of the method 700 may therefore provide a wider and more varied set of access control rights while reducing the risk of providing excessive or complete access to the underlying database that represents the social graph. The modification made by the POST request may only affect access to the resources of the user, or those resources accessible to the user who authorized the request (Joe Subscriber) and can be reversed by a corresponding HTTP DELETE request or other operation. In one embodiment, the mechanism for inserting the query may be to create a record that is associated with the end user. The inserted record may contain the query and the associated path to be used in the GET request. In various embodiments, the Web service supports one or query languages and publishes a schema to accompany the query languages. In one embodiment, the new node or the attached query may be temporary. For example, the node or query may be added in response to the user invoking the service that utilizes the node or query. The node or query may also be removed or deleted, e.g., in response to termination of the service that uses the node or query.

Figure 8:
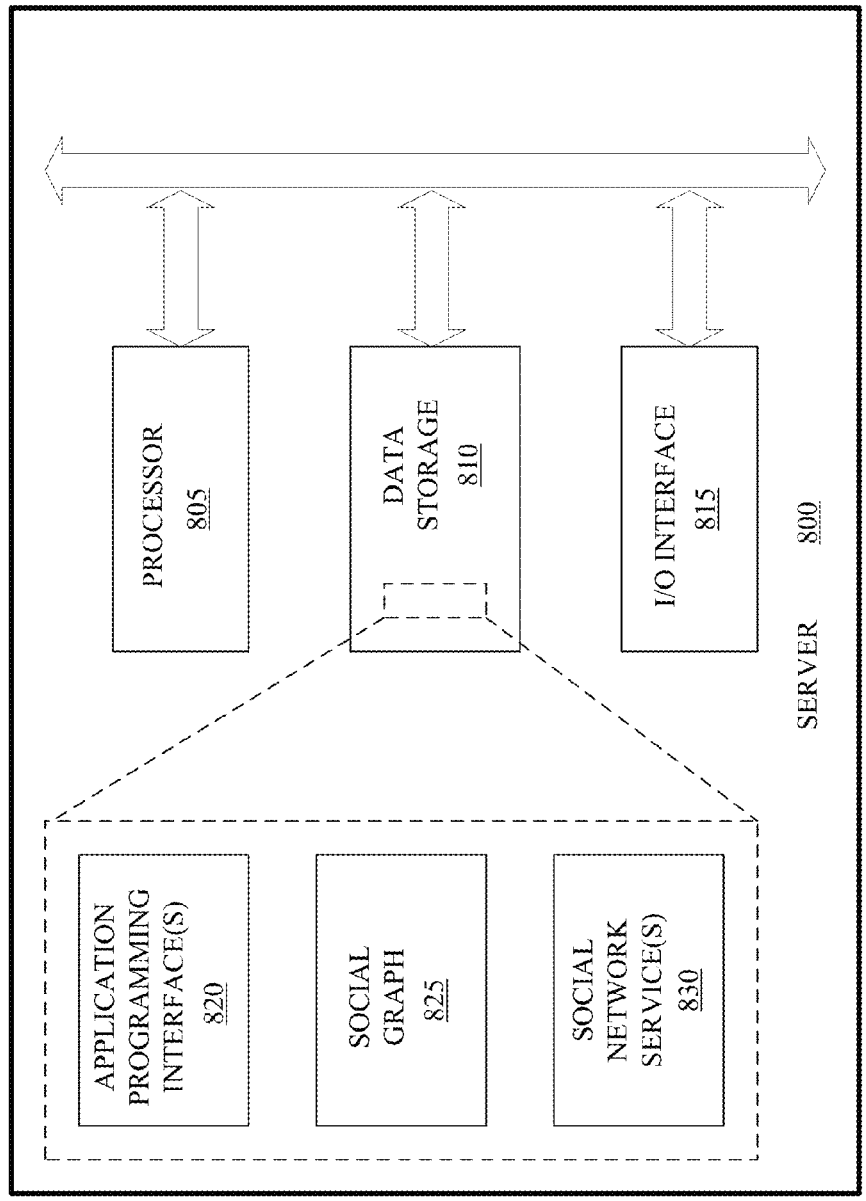
FIG. 8 conceptually illustrates one exemplary embodiment of a server that may be used to store portions of a social graph, implement application programming interfaces to a social graph, or implement social network services.

FIG. 8 conceptually illustrates one exemplary embodiment of a server 800 that may be used to store portions of a social graph, implement application programming interfaces to a social graph, or implement social network services. In the illustrated embodiment, the server 800 includes a processor 805, data storage 810, and an input/output (I/O) interface 815. The processor 805 is configured to control operation of the server 800, e.g., using data or instructions stored in the data storage 810 or at other locations. Embodiments of the operations that may be performed by the server 800 are described herein in conjunction with FIGS. 1-7. In one embodiment, the data storage 810 stores information 820 that represents one or more application programming interfaces to the social graph, information 825 that represents portions of the social graph, or information 830 that represents social network services that may use information stored in social graph.

Although FIG. 8 depicts a single server 800, persons of ordinary skill in the art having benefit of the present disclosure should appreciate that alternative embodiments may use multiple servers and may distribute portions of the functionality depicted FIG. 8 throughout the multiple servers. In some embodiments, the server 800 may be a virtual machine. In some of these embodiments, the virtual machine may include components from different machines or be geographically dispersed. For example, the data storage 810 and the processor 805 may be in two different physical machines. When processor-executable programs such as the social network services 830 are implemented on the processor 805, the program code segments combine with the processor 805 to provide a unique device that operates analogously to specific logic circuits.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
   receiving information for configuring a query in response to a service being invoked, wherein the service is configured to use the query to request access to resources of a social graph associated with a first user, wherein a subset of the resources is associated with a node in a portion of the social graph; and
   attaching the query to the node so that the query operates on the subset of the resources of the social graph associated with the node, and wherein the query returns information indicating whether a request to access the subset of the resources is granted or denied depending on a current state of the social graph.

2. The method of claim 1, comprising receiving, from a second user, the request to access the subset of the resources associated with the node and invoking the query in response to receiving the request.

3. The method of claim 2, wherein invoking the query comprises determining whether to grant or deny the request based upon at least one of a relationship of the second user to the first user or a relationship of the second user to the subset of the resources, wherein the relationships are represented by edges in the social graph.

4. The method of claim 3, wherein invoking the query comprises returning a Boolean value indicating whether the request for access to the subset of the resource is granted or denied.

5. The method of claim 1, wherein attaching the query to the node comprises attaching the query to the node in response to the first user invoking the service that requests access to the subset of the resources associated with the node.

6. The method of claim 5, comprising adding the node to the portion of the social graph associated with the first user in response to the first user invoking the service and then attaching the query to the newly added node.

7. The method of claim 5, comprising deleting the query in response to the first user terminating the service.

8. The method of claim 1, wherein attaching the query to the node comprises attaching the query to the node in response to determining that the first user authorized attaching the query to the node owned by the first user.

9. The method of claim 1, wherein attaching the query to the node comprises attaching the query to the node in response to determining that a service provider that owns the social graph authorized attaching the query to the node owned by the first user.

10. A method, comprising:
    invoking a service configured to perform queries on resources of a social graph owned by a first user, wherein a subset of the resources is associated with a node in a portion of the social graph; and
    attaching a query to the node in response to invoking the service so that the query determines whether to grant or deny requests to access the subset of the resources associated with the node depending on a current state of the social graph.

11. The method of claim 10, wherein attaching the query to the node comprises attaching the query to the node in response to the first user invoking the service that requests access to the subset of the resources associated with the node.

12. The method of claim 11, comprising adding the node to the portion of the social graph associated with the first user in response to the first user invoking the service and then attaching the query to the newly added node.

13. The method of claim 11, comprising deleting the query in response to the first user terminating the service.

14. The method of claim 10, wherein attaching the query to the node comprises attaching the query to the node in response to determining that the first user authorized attaching the query to the node owned by the first user.

15. The method of claim 10, wherein attaching the query to the node comprises attaching the query to the node in response to determining that a service provider that owns the social graph authorized attaching the query to the node owned by the first user.

16. The method of claim 10, comprising receiving, from a second user, a request to use the service to access the subset of the resources associated with the node and invoking the query in response to receiving the request.

17. The method of claim 16, wherein invoking the query comprises determining whether to grant or deny the request based upon at least one of a relationship of the second user to the first user or a relationship of the second user to the subset of the resources, wherein the relationships are represented by edges in the social graph.

18. The method of claim 16, wherein invoking the query comprises returning a Boolean value indicating whether the request for access to the subset of the resources is granted or denied.

19. The method of claim 18, comprising providing the service with access to the resource in response to the query returning the Boolean value indicating that the request is granted.

20. An apparatus for providing access control to portions of a social graph, the apparatus comprising:
    a data storage; and
    a processor communicatively coupled to the data storage, the processor being configured to:
        receive information for configuring a query in response to a service being invoked, wherein the service is configured to use the query to request access to resources of a social graph associated with a first user, wherein a subset of the resources is associated with a node in a portion of the social graph; and
        attach the query to the node so that the query operates on the subset of the resources associated with the node, and wherein the query returns information indicating whether a request to access the subset of the resources is granted or denied depending on a current state of the social graph.

21. The apparatus of claim 20, wherein the processor is configured to receive, from a second user, the request to access the subset of the resources associated with the node and invoke the query in response to receiving the request.

22. The apparatus of claim 20, wherein the processor is configured to attach the query to the node by attaching the query to the node in response to the first user invoking the service that requests access to the subset of the resources associated with the node.

23. The apparatus of claim 22, wherein the processor is configured to add the node to the portion of the social graph associated with the first user in response to the first user invoking the service and then attaching the query to the newly added node.

24. The apparatus of claim 22, wherein the processor is configured to delete the query in response to the first user terminating the service.

25. The apparatus of claim 20, wherein the processor is configured to attach the query to the node by attaching the query to the node in response to determining that the first user authorized attaching the query to the node owned by the first user.

26. The apparatus of claim 20, wherein the processor is configured to attach the query to the node by attaching the query to the node in response to determining that a service provider that owns the social graph authorized attaching the query to the node owned by the first user.

27. An apparatus for providing access control to portions of a social graph, the apparatus comprising:
a data storage; and
a processor communicatively coupled to the data storage, the processor being configured to:
invoke a service configured to perform queries on resources of a social graph owned by a first user, wherein a subset of the resources is associated with a node in a portion of the social graph; and
attach a query to the node in response to invoking the service so that the query determines whether to grant or deny requests to access the subset of the resources associated with the node depending on a current state of the social graph.

28. The apparatus of claim 27, wherein the processor is configured to add the node to the portion of the social graph associated with the first user in response to the first user invoking the service and then attaching the query to the newly added node.

29. The apparatus of claim 27, wherein the processor is configured to delete the query in response to the first user terminating the service.

30. The apparatus of claim 27, wherein the processor is configured to attach the query to the node by attaching the query to the node in response to determining that the first user authorized attaching the query to the node owned by the first user.

31. The apparatus of claim 27, wherein the processor is configured to attach the query to the node by attaching the query to the node in response to determining that a service provider that owns the social graph authorized attaching the query to the node owned by the first user.

* * * * *